(12) United States Patent
Cayssials et al.

(10) Patent No.: US 11,975,859 B2
(45) Date of Patent: May 7, 2024

(54) PROPULSIVE ASSEMBLY FOR AIRCRAFT

(71) Applicant: Airbus Operations SAS, Toulouse (FR)

(72) Inventors: Julien Cayssials, Toulouse (FR);
Adeline Soulie, Toulouse (FR); Arnaud Guichot, Toulouse (FR); Nicolas Brachet, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 17/383,559

(22) Filed: Jul. 23, 2021

(65) Prior Publication Data
US 2022/0024599 A1    Jan. 27, 2022

(30) Foreign Application Priority Data

Jul. 27, 2020 (FR) .................................... 2007881

(51) Int. Cl.
| | |
|---|---|
| *B64D 27/40* | (2024.01) |
| *B64D 27/12* | (2006.01) |
| *B64D 29/06* | (2006.01) |
| *F02C 7/20* | (2006.01) |
| *B64D 45/00* | (2006.01) |

(52) U.S. Cl.
CPC ............. *B64D 29/06* (2013.01); *B64D 27/12* (2013.01); *B64D 27/40* (2024.01); *F02C 7/20* (2013.01); *B64D 27/402* (2024.01); *B64D 2045/009* (2013.01)

(58) Field of Classification Search
CPC ........................................................ F02C 7/24
See application file for complete search history.

(56) References Cited

U.S. PATENT DOCUMENTS

| | | | | | |
|---|---|---|---|---|---|
| 3,873,234 | A | * | 3/1975 | Penny ........................ | F01D 5/18 416/241 B |
| 4,471,609 | A | * | 9/1984 | Porter ..................... | B64D 27/18 244/129.4 |
| 5,110,069 | A | * | 5/1992 | Webb ........................ | F02K 1/60 239/265.29 |

(Continued)

FOREIGN PATENT DOCUMENTS

| | | |
|---|---|---|
| EP | 2537756 A2 | 12/2012 |
| FR | 3048957 A1 | 9/2017 |
| FR | 3060652 A1 | 6/2018 |

*Primary Examiner* — Todd E Manahan
*Assistant Examiner* — Marc J Amar
(74) *Attorney, Agent, or Firm* — Greer, Burns & Crain, Ltd.

(57) ABSTRACT

A propulsive assembly for aircraft comprising an engine, a nacelle arranged around the engine and a pylon supporting the engine, the nacelle including two engine cowls and reversing cowls, each cowl having an internal skin, characterized in that at least one of the cowls of the nacelle comprises at least one box arranged in a space situated between the internal skin of the cowl and the engine, the box delimiting a volume of inert material, the inert material being flame retardant foam. This box partially blocks a zone of the engine where a fire is likely to begin, which makes it possible to limit the volume of a fire zone of the engine, and thus reduce the quantity of extinguishing agent which is necessary to extinguish a fire in the zone of the engine concerned.

4 Claims, 2 Drawing Sheets

(56) References Cited

U.S. PATENT DOCUMENTS

| | | | | |
|---|---|---|---|---|
| 5,157,915 A | * | 10/1992 | Bart | F01D 25/243 |
| | | | | 244/54 |
| 2003/0156940 A1 | * | 8/2003 | Czachor | F01D 21/045 |
| | | | | 415/119 |
| 2004/0045767 A1 | * | 3/2004 | Byrne | G10K 11/175 |
| | | | | 181/241 |
| 2005/0045774 A1 | * | 3/2005 | Hocking | B64D 29/00 |
| | | | | 244/209 |
| 2006/0179817 A1 | * | 8/2006 | Maguire | F01D 25/24 |
| | | | | 60/226.1 |
| 2010/0124494 A1 | * | 5/2010 | Howarth | B64D 29/00 |
| | | | | 415/213.1 |
| 2011/0052383 A1 | * | 3/2011 | Lussier | F01D 21/045 |
| | | | | 156/190 |
| 2013/0216364 A1 | * | 8/2013 | Evans | F04D 29/40 |
| | | | | 415/182.1 |
| 2014/0147269 A1 | * | 5/2014 | Porte | F01D 25/243 |
| | | | | 415/213.1 |
| 2015/0030440 A1 | | 1/2015 | Holland et al. | |
| 2015/0118023 A1 | * | 4/2015 | Caulfeild | F02K 1/827 |
| | | | | 181/292 |
| 2016/0288210 A1 | * | 10/2016 | Birnkrant | B22F 5/009 |
| 2017/0089358 A1 | * | 3/2017 | Radomski | F04D 29/522 |
| 2018/0118355 A1 | | 5/2018 | Pautis et al. | |
| 2018/0258854 A1 | * | 9/2018 | Sidelkovskiy | F02C 7/045 |
| 2020/0248626 A1 | * | 8/2020 | Hamp | F02K 3/04 |
| 2021/0101690 A1 | * | 4/2021 | Byrne | E05C 19/12 |

\* cited by examiner

PROPULSIVE ASSEMBLY FOR AIRCRAFT

CROSS-REFERENCES TO RELATED APPLICATIONS

This application claims the benefit of the French patent application No. 2007881 filed on Jul. 27, 2020, the entire disclosures of which are incorporated herein by way of reference.

FIELD OF THE INVENTION

The present application relates to a propulsive assembly for aircraft comprising a faired engine and having one or more zones of the engine in which a fire is likely to begin, called engine fire zones, in which the volume is reduced with respect to the engine fire zones of the prior art.

BACKGROUND OF THE INVENTION

Conventionally, and as represented in portions of FIGS. 1 and 2, a propulsive assembly 8 comprises a pylon 12 which is fixed under a wing 14 of the aircraft, and a turbomachine 10 fixed to the pylon 12. The turbomachine 10 comprises an engine 16 and a nacelle 18 surrounding the engine 16. The engine 16 comprises, from upstream to downstream in the direction of the air streams F in the nacelle 18, a fan 20, surrounded by a fan casing 22, and an engine body 24 surrounded by an engine casing 17, linked to the fan 20 and allowing, in operation, the latter to be driven in rotation. The nacelle 18 comprises two engine cowls 19 surrounding the fan 20 and corresponding to a front part of the engine 16 and reversing cowls 21 surrounding the engine body 24 and materializing a rear part of the engine 16.

The engine 16 of the turbomachine 10 has one or more zones in which a fire is likely to begin: a first fire zone 26 corresponding to the zone of the engine body 24, and, for an engine presenting a risk of fire in the zone of the fan 20, a second fire zone 28 corresponding to the zone of the fan 20.

For safety, the turbomachine 10 is provided with a detection system (not represented in the figures) configured to detect a fire in the zones presenting a risk of fire.

The turbomachine 10 is also provided with an extinguishing system 30 that allows, once a fire is detected, an extinguishing agent to be discharged to the fire zone or zones of the engine concerned, so as to extinguish the fire.

This extinguishing system 30 is composed, for each engine 16, of at least two tanks 32 containing an extinguishing agent which are installed in the pylon 12 supporting the engine 16 of the aircraft, and a diffusion system, composed notably of pipes 34, connected to the tanks 32, and conveying the extinguishing agent to the fire zone or zones of the engine, the extinguishing agent being dispensed through nozzles 36 in the fire zone or zones concerned.

The extinguishing agent is then distributed throughout the fire zone or zones of the engine by means of the ventilation of the engine, to reach a concentration by volume which allows the fire to be extinguished.

The volume of extinguishing agent necessary to extinguish an engine fire varies from one engine to another. This volume depends primarily on the volume of air in the fire zone or zones of the engine where a fire may be declared (zone of the engine body only, or both in the zone of the engine body and in the zone of the fan based on the identified fire risks) and on the ventilation in these fire zones.

The volume of a fire zone of the engine to be extinguished depends on the aerodynamic form of the fairing of the engine 16 (i.e., the form of the nacelle 18) and on the equipment installed in this zone. This volume is calculated by considering the volume of the fire zone of the engine considered and by subtracting therefrom all the equipment which are installed in this zone (i.e., engine equipment, pipes, engine harnesses, etc.).

However, in order to maintain an aerodynamic form of the nacelle 18 and optimal operation of the engine 16, the partitioning of the fire zone or zones of the engine and of the engine equipment cannot be shifted in order to reduce the volume of one fire zone of the engine.

SUMMARY OF THE INVENTION

The present invention aims to remedy all or part of the drawbacks of the prior art. In particular, the present invention aims to provide a propulsive assembly in which the volume of a fire zone of the engine is optimized, and therefore that requires a volume and a quantity of extinguishing agent that are reduced in engine fire cases.

To this end, the subject of the invention is a propulsive assembly for aircraft comprising an engine, a nacelle arranged around the engine on a common longitudinal axis, and a pylon supporting the engine, the nacelle including two engine cowls of "C"-shaped cross section articulated on the pylon and that can be linked to one another in the closed position, and reversing cowls following the engine cowls along the longitudinal axis, each cowl having an internal skin.

According to the invention, at least one of the cowls of the nacelle comprises at least one box arranged in a space situated between the internal skin of the cowl and the engine, the box delimiting a volume of inert material, the inert material being fire retardant foam.

Advantageously, the box partially blocks a zone where an engine fire is likely to begin, which makes it possible to limit the volume of a fire zone of the engine. In fact, the box is housed in a space usually filled with air and where an engine fire can therefore spread. The volume of the fire zone of the engine according to the invention is thus reduced compared to the volume of the fire zone according to the prior art, and the quantity of extinguishing agent which is needed to extinguish a fire in the fire zone concerned is reduced. The volume of the extinguishing agent tanks, and their weight, can thus be reduced which makes it easier for the extinguishing agent tanks to be built into the aircraft.

According to a feature, the at least one box is formed by a folded and welded steel sheet, and comprises edges which are fixed removably onto the internal skin of the cowl of the nacelle. The box is thus advantageously removable, and can be replaced if damaged.

According to a feature, the link between the edges of the box and the internal skin of the cowl of the nacelle is tight.

As a variant, the box and the cowl of the nacelle are single-piece parts.

BRIEF DESCRIPTION OF THE DRAWINGS

Other features and advantages will emerge from the following description of the invention, a description given by way of example only, in light of the attached drawings in which.

DETAILED DESCRIPTION OF THE PREFERRED EMBODIMENTS

Figure 1:
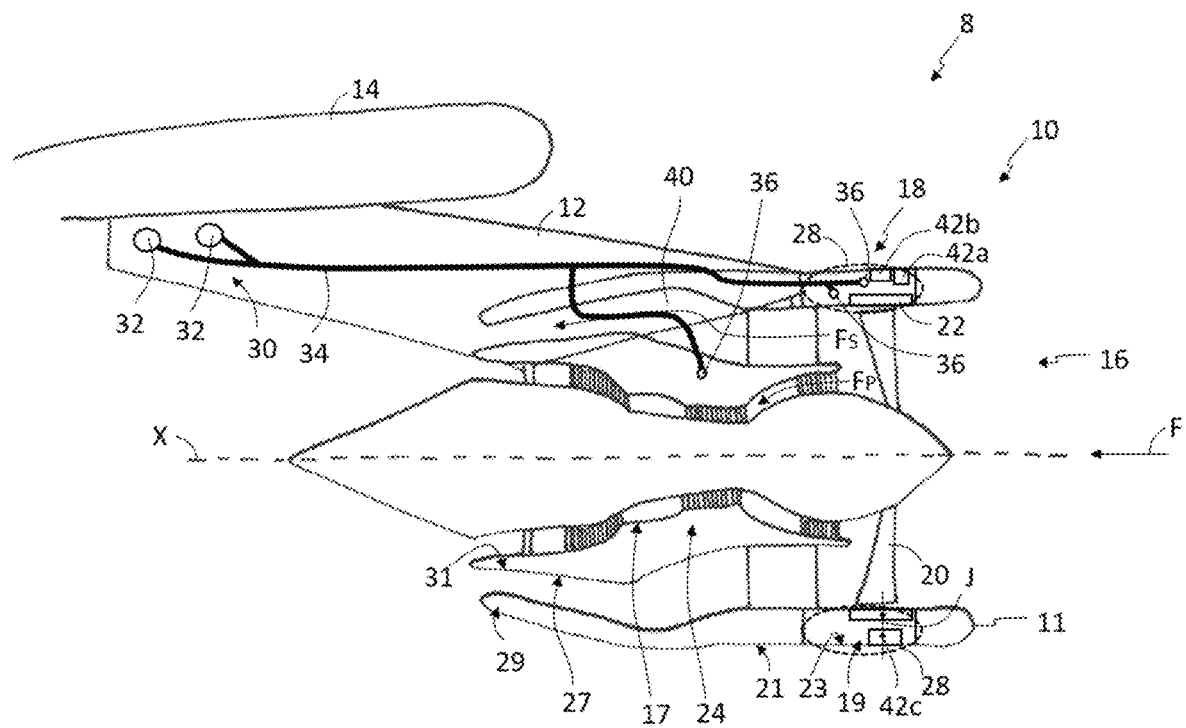
FIG. 1 is a cross-sectional view of a propulsive assembly for aircraft according to an embodiment of the invention.
Figure 2:
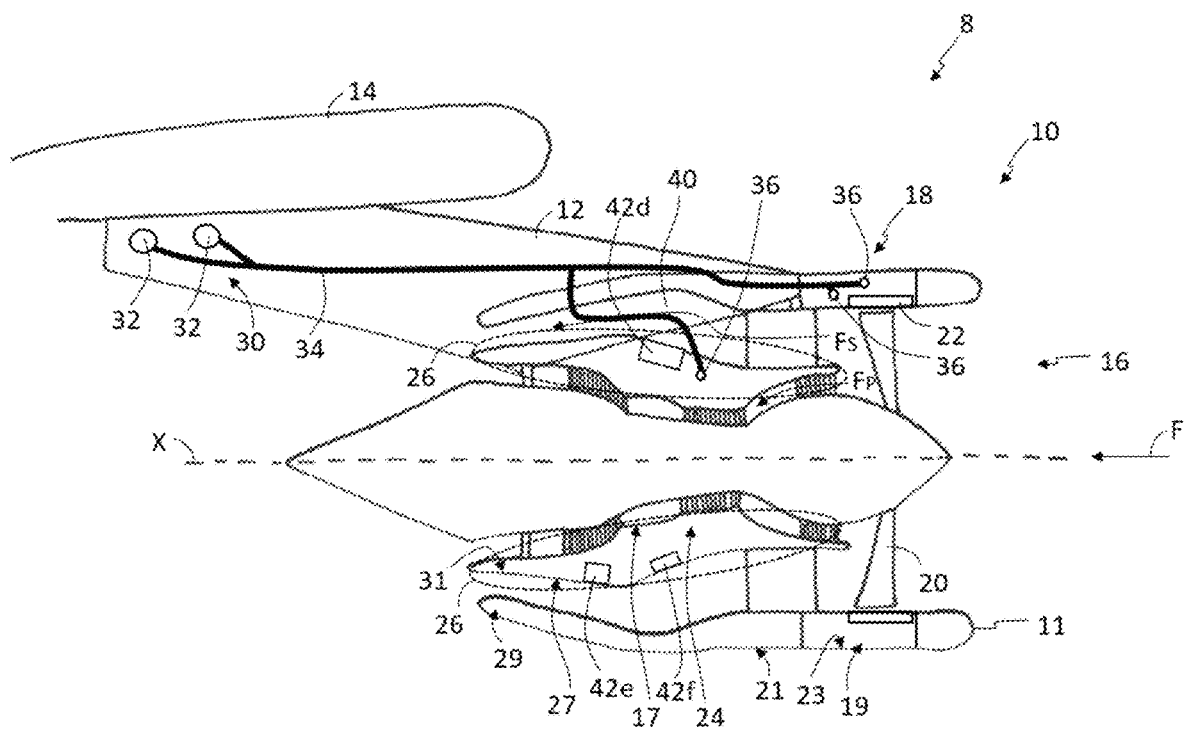
FIG. 2 is a cross-sectional view of a propulsive assembly for aircraft according to another embodiment of the invention.

As represented in FIGS. 1 and 2, a propulsive assembly 8 comprises a pylon 12 fixed under a wing 14 of an aircraft and a nacelle 18 fixed to the pylon 12 and which houses a turbomachine 10 extending longitudinally on a longitudinal axis X. The pylon 12 is thus configured to support the engine 16. The nacelle 18 is annular and centered on the longitudinal axis X.

In the following description, the terms relating to a position are taken with reference to the direction of movement of the aircraft when the turbomachine 10 is operating.

The turbomachine 10 comprises an engine 16 and the nacelle 18 which is arranged around the engine 16 on the longitudinal axis X which is common to the engine 16 and to the nacelle 18. Air penetrates into the engine 16 through an air intake which is surrounded by an air intake cowl 11. The engine 16 comprises, from upstream to downstream in the direction of the air streams in the nacelle 18 represented by the arrow F, a fan 20 faired by a fan casing 22, and an engine body 24 provided to, in operation, drive the fan 20 in rotation. The engine body 24 is faired by an engine casing 17.

In particular, the turbomachine 10 is a turbofan engine. The air streams F pass through the fan 20 and are split up into a primary stream FP which passes through the engine body 24, and a secondary air stream FS which passes through a fan duct 40, also called bypass duct, formed around the engine 16. These air streams FS and FP rejoin and are then mixed together at the nozzle of the engine 16.

Figure 3:
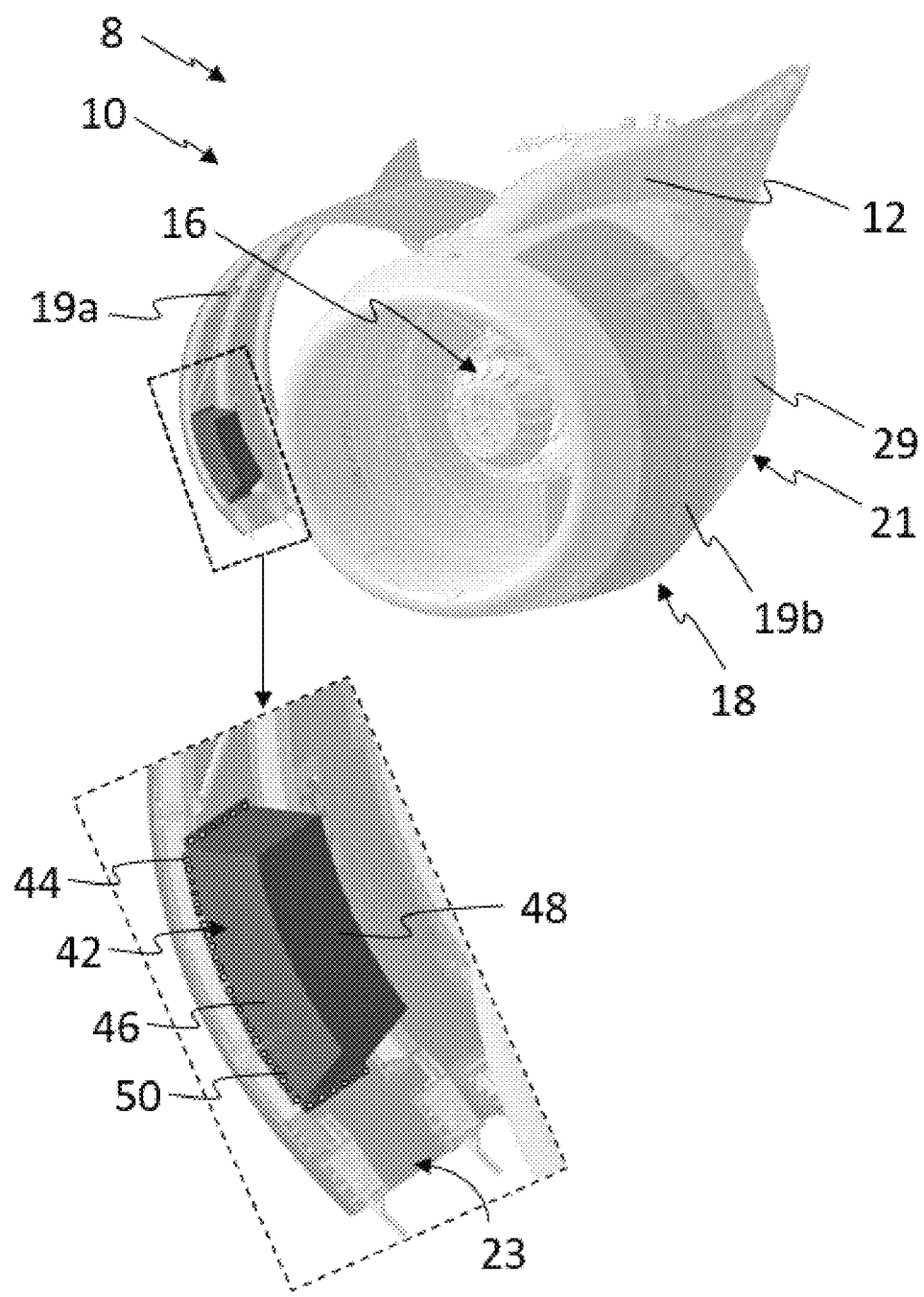
FIG. 3 is a perspective view of a propulsive assembly for aircraft according to an embodiment of the invention.

As represented in FIG. 3, in order to ensure maintenance of the engine 16, the nacelle 18 comprises two engine cowls 19 and two reversing cowls 21.

The engine cowls 19, also called fan cowl, are arranged around the front part of the engine 16, and more specifically around the fan 20, and notably around the fan casing 22. Thus, the engine cowls 19 materialize the front part of the nacelle 18. Each engine cowl 19 has an internal skin 23.

The engine cowls 19 have a generally "C"-shaped cross section and are mounted articulated on the pylon 12, via hinges (not visible in the figures), and can be linked to one another in the closed position. Each engine cowl 19 is thus mounted to be movable between a closed position (the engine cowl 19b is represented in the closed position in FIG. 3) in which the engine cowl 19 is tightened around the engine 16, and an open position in which the engine cowl 19 is separated from the engine 16 (the engine cowl 19a is represented in the open position in FIG. 3). In the closed position, the two engine cowls 19 are contiguous and overall form a cylinder which surrounds the engine 16. The engine cowls 19 are locked in the closed position by locks (not represented in the figures).

The reversing cowls 21 follow the engine cowls 19 along the longitudinal axis X. Thus, the reversing cowls 21 materialize the rear part of the nacelle 18. The reversing cowls 21 are arranged around the engine body 24. Each reversing cowl 21 comprises an inner cowl 27 (also called IFS, for "Internal Fixed Structure"), and an outer cowl 29 (also called OS, for "Outer Structure"). The inner cowls 27 are radially closer to the axis X than the outer cowls 29. The inner cowls 27 are arranged around the engine 16 and the outer cowls 29 are arranged around the inner cowls 27. Each inner cowl 27 has an internal skin 31 oriented towards the engine 16. For each reversing cowl 21, the inner cowl 27 is secured to the outer cowl 29.

The reversing cowls 21 are mounted articulated on the pylon 12, via hinges (not visible in the figures), and can be linked to one another in the closed position.

More specifically, each inner cowl 27 is mounted articulated on the pylon 12 via at least one hinge (not visible in the figures) and is movable between a closed position in which the inner cowl 27 is tightened around the engine 16 and an open position in which the inner cowl 27 is separated from the engine 16.

Each outer cowl 29 is mounted articulated on the pylon 12 via at least one hinge (not visible in the figures) and is movable between a closed position in which the outer cowl 29 is tightened around the associated inner cowl 27 and therefore the engine 16, and an open position in which the outer cowl 29 is separated from the engine 16.

In the closed position, the two inner cowls 27 are contiguous and overall form a cylinder which surrounds the engine 16 and constitute an internal part of the bypass duct 40, and the two outer cowls 29 overall form a cylinder which surrounds the inner cowls 27 and constitute an outer part of the bypass duct 40. Thus, in the closed position, the reversing cowls 21 delimit the zone of the engine body 24 situated between the engine casing 17 and the internal skins of the inner cowls 27, which is an engine fire zone, and delimit the bypass duct 40 in which the bypass stream FS flows.

The reversing cowls 21 are locked in the closed position by locks (not represented in the figures).

The engine and reversing cowls according to the invention are not described in more detail because these cowls are identical to the engine and reversing cowls of the prior art.

Conventionally, and as represented in FIGS. 1 and 2, the engine 16 of the turbomachine 10 has several zones in which a fire is likely to begin: a first fire zone 26 corresponding to the zone of the engine body 24 and a second fire zone 28 corresponding to the zone of the fan 20.

The turbomachine 10 is also provided with a detection system (not represented in the figures) and an engine fire extinguishing system 30, which are not detailed because they are identical to those of the prior art.

According to an embodiment of the invention represented in FIGS. 1 and 3, at least one of the engine cowls 19 comprises one or more boxes 42a, 42b, 42c, the or each box 42 being arranged in a space situated between the internal skin 23 of the engine cowl 19 and the engine 16. More specifically, a box 42 is arranged in a space situated between the internal skin 23 of the engine cowl 19 and the fan casing 22.

Each box 42 delimits a volume of inert material. The inert material can be gaseous or solid. According to one embodiment, each box 42 is filled only with air. According to another embodiment, each box 42 is filled with fire-retardant foam, that is to say non-flammable foam. This or these boxes 42 allow the volume of the second fire zone 28 to be reduced. In fact, no fluid and no flame can penetrate into a box 42.

As each engine cowl 19 is movable to a position in which the engine cowl 19 is separated from the engine 16, the, or each, box 42 is advantageously directly accessible and can be inspected by opening the engine cowl or cowls 19.

As represented in FIG. 1, several boxes 42a, 42b are arranged on the internal skin 23 of the engine cowl 19, along the longitudinal axis X. The boxes 42a, 42b are arranged alongside one another, at a distance from one another.

As represented in FIG. 1, several boxes 42a, 42c are arranged on the internal skin 23 of the engine cowl 19, radially about the longitudinal axis X. In other words, the boxes 42a, 42c are arranged over the entire circumference of the engine cowls 19.

According to an embodiment represented in FIG. 3, a box 42 is formed from a metallic material, for example a folded and welded steel sheet. A box 42 is made of composite material or of metal alloy.

According to another embodiment, a box 42 is formed by stamping.

The box 42 comprises lateral walls 46 which extend from the internal skin 23 of the engine cowl 19 radially towards the axis X, and which are all linked to a top wall 48. The top wall 48 is substantially parallel to the internal skin 23 of the engine cowl 19. In FIG. 3, when the engine cowl 19 is in the closed position, the top wall 48 extends radially about the axis X, that is to say, over an angular segment centered on the axis X. The lateral walls 46 are also each linked to edges 50. The edges 50 are substantially parallel to the internal skin 23 of the engine cowl 19. The edges 50 are fixed, removably, onto the internal skin 23 of the engine cowl 19, for example by means of screws 44 and nuts (not visible in the figures). The edges 50 of the box 42 can also be riveted onto the internal skin 23 of the engine cowl 19. Advantageously, the box can thus be removed and easily replaced if damaged.

According to a preferred embodiment, the link between the edges 50 of the box 42 and the internal skin 23 of the engine cowl 19 is tight. Each box 42 is fixed to the engine cowl 19 by fixings spaced apart by a small pitch. A tight pitch between the fixings makes it possible to prevent the intrusion of flammable fluids or of flames into the box 42. This thus makes it possible to take the volume delimited by the box 42 out of a fire zone, and therefore segregate the box 42 from the fire zone. Each box 42 is thus made tight by its fixing to the engine cowl 19.

According to another embodiment, the, or each, box 42 is tight and comprises at least one seal (not represented in the figures) disposed between each edge 50 of the box 42 and the internal skin 23 of the engine cowl 19. Seals (not represented in the figures) may also be present at each join between two lateral walls 46, or at each join between a lateral wall 46 and the top wall 48.

The general form of the box or boxes 42 is dependent on the installation of the equipment, pipes or harnesses of the engine 16. In FIG. 3, the box 42 has the form of an annular portion, since the box 42 is fixed onto the internal skin 23 of the engine cowl 19 which is of annular form. Obviously, a box can have any other geometrical form suited to the environment in which the box is intended to be arranged. For example, in FIG. 3, the top wall 48 of the box 42 is represented as being convex. Obviously, the top wall 48 of the box 42 can also be flat, or concave, or even have corrugations, depending on the environment in which the box 42 is arranged.

As represented in FIG. 1, there is a gap J which extends between a box 42a-c, and notably its top wall 48, and the fan casing 22. This gap makes it possible to avoid having the box 42 being damaged in the event of the loss of a blade of the fan 20. In fact, an engine fire may follow a loss of a blade of the fan 20, which would have damaged the fan casing 22. In order to conserve the functionality of the box 42, that is to say, delimit a volume of inert material, the gap J makes it possible to take account of a potential deformation of the fan casing 22, and therefore makes it possible to avoid having the box 42 and the fan casing 22 come into contact (which could pierce the box 42). The gap J therefore depends on the engine 16 and on the possible deformations of the fan casing 22 upon a loss of blade, the latter depending, in a nonlimiting manner, on the material and on the stiffness of the fan casing, or on the weight of the blade that is lost.

According to another embodiment represented in FIG. 2, at least one of the reversing cowls 21 comprises one or more boxes 42d, 42e, 42f, the or each box 42d-f being arranged in a space situated between the internal skin 31 of the inner cowl 27 of the reversing cowl 21 and the engine 16. More specifically, a box 42d-f is arranged in a space situated between the internal skin 31 of the inner cowl 27 of the reversing cowl 21 and the engine casing 17. Each box 42d-f delimits a volume of inert material. Each box 42 allows the volume of the first fire zone 26 to be reduced.

The features described previously for the box or boxes 42 arranged in a space situated between the internal skin 23 of an engine cowl 19 and the fan casing 22 apply also for the box or boxes 42d-f arranged in a space situated between the internal skin 31 of an inner cowl 27 of a reversing cowl 21 and the engine casing 17.

As each reversing cowl 21 is movable to a position in which the reversing cowl 21 is separated from the engine 16, the, or each, box 42d-f is advantageously directly accessible and can be inspected by opening the reversing cowl or cowls 21. More specifically, since the inner 27 and outer 29 cowls of a reversing cowl 21 are secured to one another, the, or each, box 42d-f fixed on the internal skin 31 of the inner cowl 27 is directly accessible by opening the outer cowl 29.

As represented in FIG. 2, several boxes 42e, 42f are arranged on the internal skin 31 of the inner cowl 27 of the reversing cowl 21, along the longitudinal axis X. The boxes 42e-f are arranged alongside one another, at a distance from one another, on the internal skin 31 of the inner cowl 27.

As represented in FIG. 2, several boxes 42d, 42f are arranged on the internal skin 31 of the inner cowl 27 of the reversing cowl 21, radially about the longitudinal axis X. In other words, the boxes 42d, 42f are arranged over the entire circumference of the inner cowl 27.

According to an embodiment not represented in the figures, the, or each, box 42 is formed in a single piece with an engine cowl 19 of the nacelle 18. In other words, the, or each, box 42 and an engine cowl 19 are single-piece parts.

According to an embodiment not represented in the figures, the, or each, box 42 is formed in a single piece with a reversing cowl 21 of the nacelle 18. In other words, the, or each, box 42 and a reversing cowl 21 are single-piece parts.

According to the invention, by virtue of the box arranged in a space between the engine and an internal skin of a cowl of the nacelle, which is an engine fire zone, a fire can no longer penetrate in the volume defined by the box, and the volume of the fire zone of the engine is therefore reduced compared to the engines of the prior art. This box therefore makes it possible to reduce the dimensions and the weight of the extinguishing agent tanks embedded on the aircraft.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A propulsive assembly for aircraft comprising:
an engine,
a nacelle arranged around the engine on a common longitudinal axis, and
a pylon supporting the engine,
the nacelle including two engine cowls of generally "C"-shaped cross section articulated on the pylon and that can be linked to one another in a closed position, and reversing cowls following the engine cowls along the longitudinal axis, each of the engine cowls and each of the reversing cowls having an internal skin,
the nacelle further including a fan casing located radially inwardly from the two engine cowls with respect to the longitudinal axis,
the nacelle further including an engine casing located radially inwardly from the reversing cowls with respect to the longitudinal axis,
wherein at least one of the engine cowls of the nacelle comprises at least one box arranged in a space situated between the internal skin of the at least one of the engine cowls and the fan casing, the at least one box delimiting a volume of inert material, the inert material being flame retardant foam, the at least one box disposed within an axial extent of the fan casing,
wherein a gap extends between the at least one box and the fan casing.

2. The propulsive assembly according to claim 1, wherein the at least one box is a steel box, and comprises edges which are fixed removably onto the internal skin of the at least one of the engine cowls of the nacelle.

3. The propulsive assembly according to claim 2, wherein a link between the edges of the at least one box and the internal skin of the at least one of the engine cowls of the nacelle is tight.

4. The propulsive assembly according to claim 1, wherein the at least one box and the at least one of the engine cowls of the nacelle are single-piece parts.

* * * * *